US011347642B2

(12) United States Patent
Poluri et al.

(10) Patent No.: US 11,347,642 B2
(45) Date of Patent: May 31, 2022

(54) APPROACH AND MECHANISM FOR CALCULATING AND CONFIGURING MEMORY MAPPING OF TREND LOG OBJECTS IN A SYSTEM

(71) Applicant: Honeywell International Inc., Morris Plains, NJ (US)

(72) Inventors: Nagasree Poluri, Bangalore (IN); Ankith Makam, Bangalore (IN); Seema P, Bokaro Steel (IN); Balaji Krishnasamy, Madurai (IN)

(73) Assignee: Honeywell International Inc., Charlotte, NC (US)

( * ) Notice: Subject to any disclaimer, the term of this patent is extended or adjusted under 35 U.S.C. 154(b) by 339 days.

(21) Appl. No.: 16/551,217

(22) Filed: Aug. 26, 2019

(65) Prior Publication Data

US 2020/0073800 A1    Mar. 5, 2020

Related U.S. Application Data

(60) Provisional application No. 62/725,990, filed on Aug. 31, 2018, provisional application No. 62/726,061, filed on Aug. 31, 2018.

(51) Int. Cl.
*G06F 12/06* (2006.01)
*G06F 12/02* (2006.01)
(Continued)

(52) U.S. Cl.
CPC ...... *G06F 12/0646* (2013.01); *F24F 11/0001* (2013.01); *F24F 11/30* (2018.01);
(Continued)

(58) Field of Classification Search
CPC .. G06F 12/0646; G06F 12/0246; G06F 7/461; G06F 7/462; G06F 9/5016;
(Continued)

(56) References Cited

U.S. PATENT DOCUMENTS 5,971,581 A * 10/1999 Gretta ............... G05B 19/0423
                                                      700/2
6,711,253 B1 * 3/2004 Prabhaker ............. H04M 3/36
                                                      379/265.01
(Continued)

FOREIGN PATENT DOCUMENTS

EP          2189857 B1    7/2010
WO        2013048405 A1   4/2013

*Primary Examiner* — Henry Tsai
*Assistant Examiner* — John B Roche
(74) *Attorney, Agent, or Firm* — Seager, Tufte & Wickhem LLP

(57) ABSTRACT

A tool for an approach and mechanism for calculating and configuring memory mapping of trend log objects in a system, such as an HVAC. It may incorporate determining available memory of a controller for trending a unit of equipment of a system. A calculation of available records may be made for configuring and using a trend. The calculation may be made in view of the controller memory and parameters including buffer size, log interval and retention time. A change in parameters may cause a recalculation of available records. The "available record" terms may be regarded as being in a user-understandable format. The format may be intuitive. Anomalies of trends of equipment may lead to spotting issues of the equipment.

20 Claims, 3 Drawing Sheets

(51) Int. Cl.
  *G06F 9/50* (2006.01)
  *G06F 7/46* (2006.01)
  *G06F 11/30* (2006.01)
  *G06F 11/34* (2006.01)
  *F24F 11/30* (2018.01)
  *F24F 11/00* (2018.01)
  *G05B 15/02* (2006.01)
  *G05B 19/042* (2006.01)
  *G05D 23/19* (2006.01)

(52) U.S. Cl.
  CPC ......... *G05B 15/02* (2013.01); *G05B 19/0423* (2013.01); *G05D 23/1934* (2013.01); *G06F 7/461* (2013.01); *G06F 7/462* (2013.01); *G06F 9/5016* (2013.01); *G06F 11/3037* (2013.01); *G06F 11/3476* (2013.01); *G06F 12/0246* (2013.01); *F24F 2011/0006* (2013.01); *G05B 2219/21105* (2013.01); *G05B 2219/2614* (2013.01); *G05B 2219/2642* (2013.01)

(58) Field of Classification Search
  CPC ... G06F 11/3037; G06F 11/3476; F24F 11/30; F24F 11/0001; F24F 2011/0006; G05B 15/02; G05B 19/0423; G05B 2219/21105; G05B 2219/2614; G05B 2219/2642; G05D 23/1934
  See application file for complete search history.

(56) References Cited

U.S. PATENT DOCUMENTS

| | | |
|---|---|---|
| 7,593,779 B2 | 9/2009 | Hsieh et al. |
| 8,694,166 B2 | 4/2014 | Quirk |
| 9,625,184 B2 | 4/2017 | Hu et al. |
| 2002/0103624 A1* | 8/2002 | Turicchi Jr. ......... G06F 11/3452 702/186 |
| 2015/0351697 A1* | 12/2015 | Weber .................. A61B 5/0002 600/324 |

* cited by examiner

APPROACH AND MECHANISM FOR CALCULATING AND CONFIGURING MEMORY MAPPING OF TREND LOG OBJECTS IN A SYSTEM

This application claims the benefit of U.S. Provisional Patent Application Ser. No. 62/726,061, filed Aug. 31, 2018. U.S. Provisional Patent Application Ser. No. 62/726,061, filed Aug. 31, 2018, is hereby incorporated by reference.

This application claims the benefit of U.S. Provisional Patent Application Ser. No. 62/725,990, filed Aug. 31, 2018. U.S. Provisional Patent Application Ser. No. 62/725,990, filed Aug. 31, 2018, is hereby incorporated by reference.

BACKGROUND

This disclosure pertains to memory and records as they pertain to trending of equipment.

SUMMARY

The disclosure reveals a tool for an approach and mechanism for calculating and configuring memory mapping of trend log objects in a system, such as an HVAC. It may incorporate determining available memory of a controller for trending a unit of equipment of a system. A calculation of available records may be made for configuring and using a trend. The calculation may be made in view of the controller memory and parameters including buffer size, log interval and retention time. A change in parameters may cause a recalculation of available records. The "available record" terms may be regarded as being in a user-understandable format. The format may be intuitive. Anomalies of trends of equipment may lead to spotting issues of the equipment.

DESCRIPTION

Figure 1:
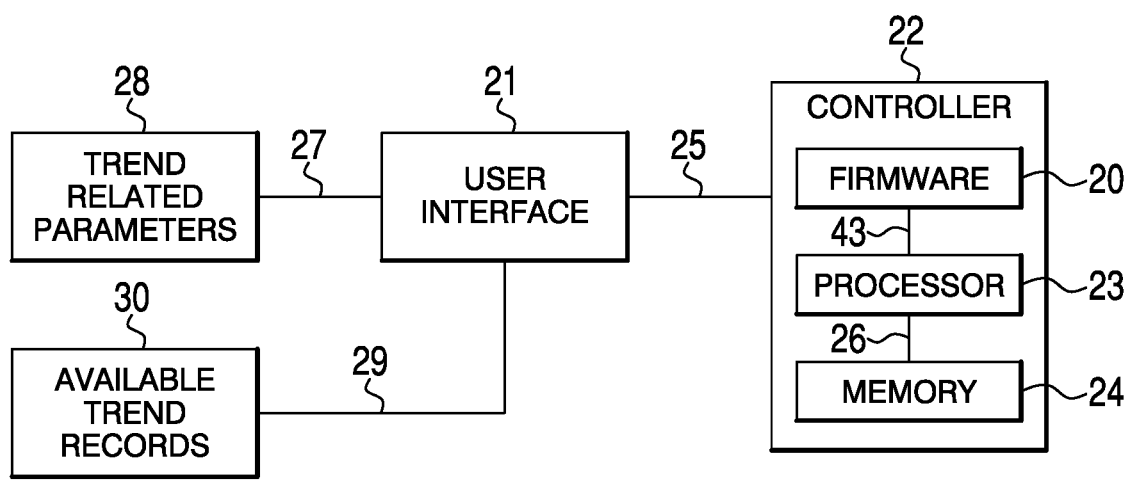
FIG. 1 is a diagram of a controller for dealing with trend information and available records.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Aspects of the system or approach may be described in terms of symbols in the drawing. Symbols may have virtually any shape (e.g., a block) and may designate hardware, objects, components, activities, states, steps, procedures, and other items.

The present system is more than about collecting trend data and a trending application being able to determine and maintain the size of total buffer that is used to store trend data. The present system may be anything about letting the user know of total available memory in a user-understandable format as and when users create more trends. The present system may be about automatic calculation of available memory and representing the same to a user when the user modifies any of the parameters like buffer size, retention time, logging or log interval, and so on, for any single trend or any trend of a point. The present system may be about how the raw memory is converted and presented to a user such that the user can plan a trend configuration.

In a heating, ventilation and air conditioning (HVAC) world, trend log configuration may be very important as it can help in monitoring the health of the system by identifying any anomaly early. Improving the performance of the system may include running analytics on the collected trend samples.

There appears to be virtually no way for users to know how much memory is allocated for the trend logs inside a controller so that one can plan a trend configuration accordingly. Also, the number of records per trend (buffer size) and log interval is not necessarily the same for all the points and/or equipment. These factors may often vary depending on the criticality of the system. This tends to make it more difficult for users to anticipate and configure trends.

Many times, users may end up identifying some critical equipment that is missed from trending and when they attempt to trend, the controller may not have sufficient memory to accommodate the same. This may call for much rework to go through an entire trend configuration and redo or re-plan a trend.

There is little or no understandable view or control to the users in terms of how many more trends can be created, what should be the buffer size and log interval of each trend, how many more trend log records can be accommodated in the controller considering available memory, and so on.

The current state of related art does not appear to have any solutions with which users can get to know an overall memory consumption summary for the trend logs in a HVAC controller.

Although buffer size (number of records per trend (object)) is available per trend, the overall available memory considering various parameters like buffer size, retention time and log interval, is not necessarily known to the user.

The present approach may be about exposing the raw memory of a controller required for trend configuration into a user-understandable format. It is an approach of calculating the available records considering total available memory of the controller. This may be an approach for automatically calculating "Available Records" considering various parameters like buffer size, log interval and retention time as to and when a trend object is created. The approach may be for recalculating the "Available records" when any of the impacting parameters are changed. It may be about providing better flexibility to the user in terms of knowing ahead the consumption of memory for a trend log and using it judiciously.

The present approach may be about the way that a user can have better control in allocating memory to the trend logs which are critical. That is, the present approach may be about a way that the user can calculate the memory which is required for a particular trend log ahead.

Advantages of the present approach may be noted. Being an intuitive approach, the approach may help in configuring trends judiciously w.r.t memory consumption. It may reduce an amount of rework done during last minute changes on a trend configuration. It may reduce the cost incurred due to rework during commissioning time.

Users and customers of the approach may have better control of a critical equipment trend configuration.

Exposing internal memory as user understandable information may be a huge differentiator that helps in better planning a trend configuration. The approach may reduce the planning and engineering time to configure trends.

The approach may be so intuitive that customers themselves may specify which equipment can have how much memory allocated based on criticality.

The approach may be a key differentiator and USP (unique selling point) for comfort point open controllers and/or tools which are targeted to be a part of an upcoming program.

In a solution, a comfort point open plant controller (CPO-PC), such as a Honeywell International Inc. model 400, may expose the total available memory for a trend configuration. This information may be used by the configuration or commissioning tools, like a CPO studio, ICS app, and so on. These tools may convert this memory into a user-understandable format, i.e., "available records", by calculating how many total trend records can be created in the controller. As to when a user creates trend objects, the "available records" may be recalculated dynamically based on a created trend's buffer size and log interval. A total memory may be translated into available records. The maximum of available records may be, for example, 10,000,000 (10M) per controller.

When a single trend is created, by an example default, the buffer size may be updated as, for instance, 14,400 records for that trend considering one second of log interval and ten days of retention time.

So after creating one trend with the default buffer size, log interval and retention time, tool may automatically calculate how many more records a user can create, i.e., available records.

The calculation for this approach may incorporate equations:

Available records=Max records that can be created minus (−) No. of trends already created times (*) buffer size; and Data retention time (in seconds)=Buffer size times (*) Log interval (in seconds).

The tool may also allow any of these parameters, like buffer size, log interval, and retention time, to be configured, and the same calculation may trigger as to when any one of these parameters changes using the above formulas.

Thus, as to when a user creates trends, a tool may intuitively inform a user on how many more trend records can be created which gives a fair idea so as how to better plan a trend configuration. A memory consumption overview may allow a user, better than otherwise, to plan critical equipment trends.

FIG. 1 is a diagram of a system for trending. A user interface 21 may have a connection 25 to a controller 22. Controller 22 may incorporate a processor 23 and a memory 24 having a connection 26 to each other. Firmware 20 may have a connection 43 to processor 23. User interface 21 may have a connection 27 to a block 28 having trend related parameters. Also, user interface 21 may have a connection 29 to a block 30 that contains available trend records.

Figure 2:
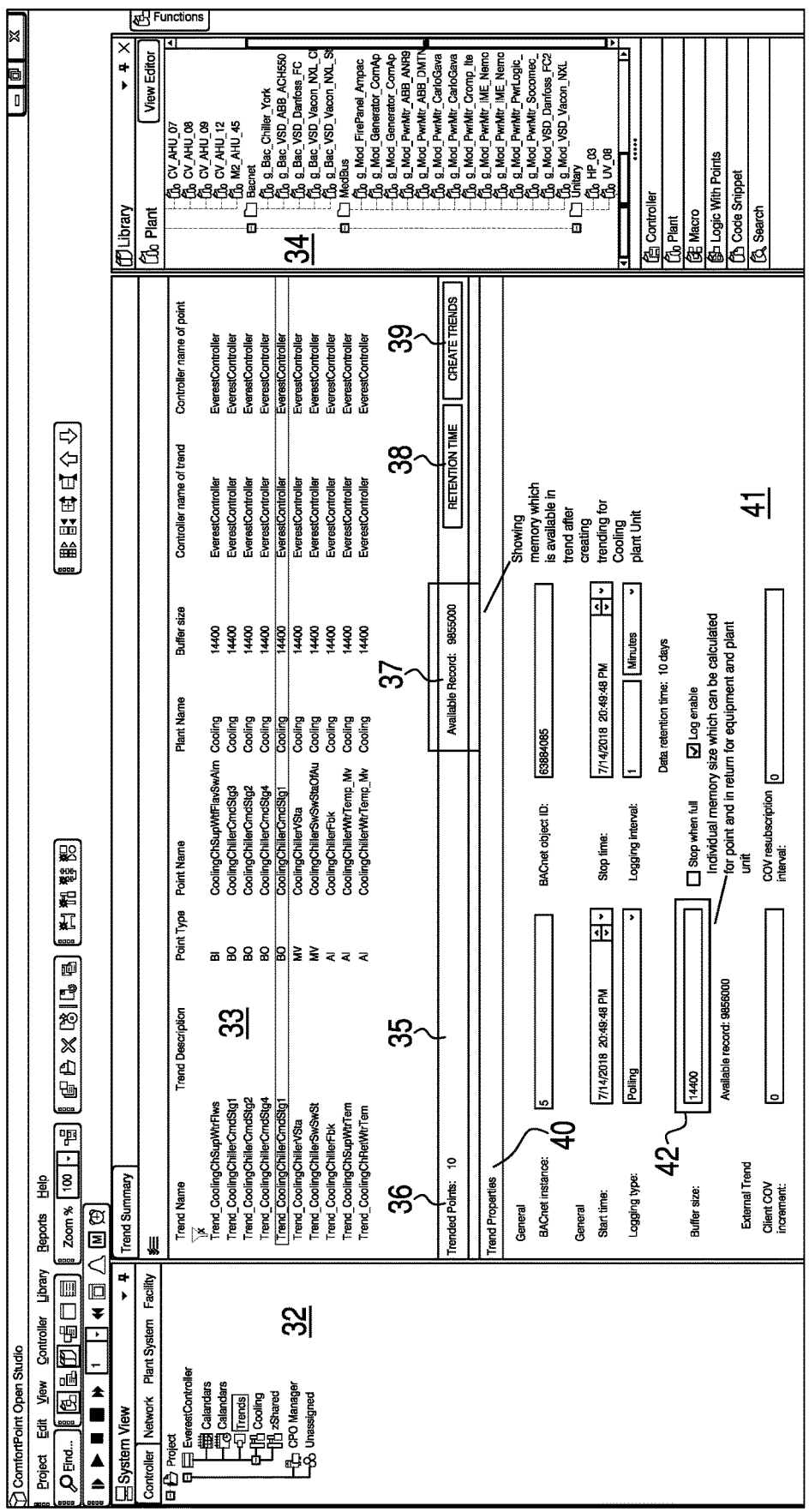
FIG. 2 and FIG. 3 are screen shots of trend information relative to the intuitive approach and system for calculating and configuring memory mapping of trend log objects in HVAC applications.
Figure 3:
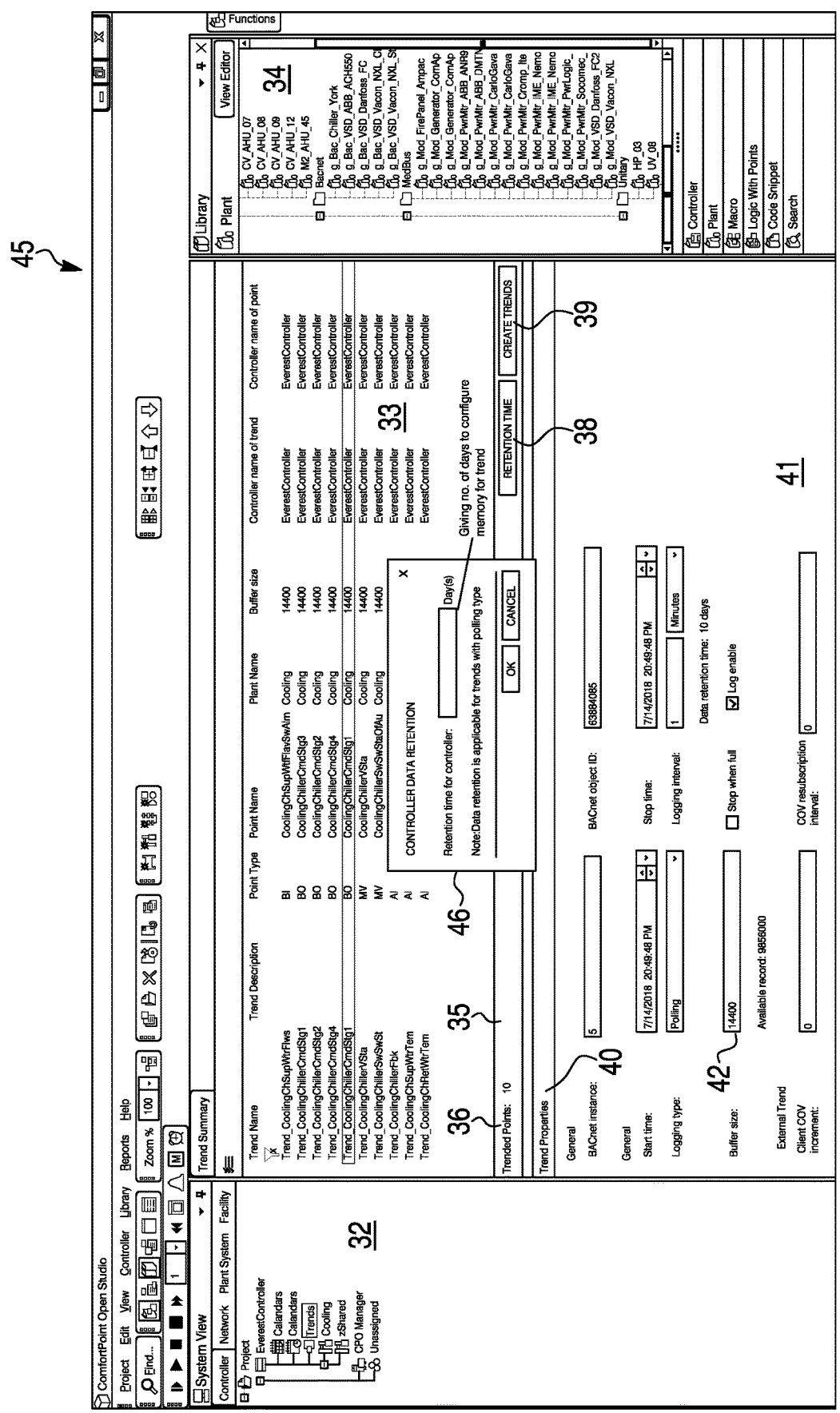

FIG. 2 and FIG. 3 are screen shots of trend information relative to the intuitive approach and system for calculating and configuring memory mapping of trend log objects in HVAC applications. Screen shot 31 of FIG. 2 is for a comfort point open studio showing a system view 32, trend pane 33 and library 34 listing system information. Trend pane 33 shows a trend name, trend description, point type, point name, plant name, buffer size, controller name of the trend, and controller name of the point. A middle row 35 of screen shot 31 may indicate a number of trend points 36, an available record 37, along with a retention time button 38 and create trends button 39. "Available Record" 37 shows the memory which may be available in a trend after creating trending, for instance, for a selected cooling plant unit.

Several items may be noted in a lower pane 41 of FIG. 2 for trend properties 40. One property to be noted is the buffer size 42, which may indicate an individual memory size that can be calculated for a point and in turn for equipment and a plant unit.

FIG. 3 is a diagram of a screen shot 45 like that of FIG. 2. A feature noted may be button 38 for retention time 46 for the controller, which indicates a number of days available to configure a memory for a trend.

The present system may let the user know of total available memory in a user-understandable format as to and when a user can or does create more trends. There may be an automatic calculation of available memory and representation of the same to a user when the user modifies any of the parameters like buffer size, retention time, log interval, and so on, for any single trend. Raw memory may be converted and presented to a user such that the user can plan a trend configuration.

There may be a software component. A stack level may incorporate an edge, that is, a hardware device with embedded software, which can be connected securely to the cloud via a wired or wireless connection. A software type and programming (tools) may involve software that programs a solution for a customer (e.g., software used by an alarm company to program an alarm system for the customer).

To recap, a system for determining memory for trend configuring, may incorporate a user interface, a controller connected to the user interface, a parameters module connected to the user interface, and a records module connected to the user interface. The parameters module may have trend parameters. The records module may have available records. One or more trend parameters may be selected from a group incorporating buffer size, retention time and log interval. A raw memory of the controller needed for a trend configuration may be exposed, leading to a calculation of available records based on the one or more trend parameters selected from the group comprising buffer size, retention time and log interval.

The calculation of available records may be automatically redone when the one or more trend parameters are changed.

A total memory of the controller may be translated into available records for a trend considering X seconds for a log interval and Y days for retention time. X may be a number. Y may be a number.

After a trend is created with a default buffer size, log interval and retention time, a tool may calculate a number of additional available records that can be created.

A calculation is based on equations incorporating $A=M-N \times T$, and $D=B \times L$. A may be a number of available records. M may be a number of maximum records that can be created. N may be number of trends already created. B may be buffer size, which is a number of records per trend. D may be retention in time units. L is a log interval in time units.

The calculation may reoccur when one or more of variables of a group incorporating A, M, N, B, D and L, change.

A result of the calculation may indicate how many trend records can be created for an intuitive purpose of planning trends for equipment.

The equipment may be HVAC equipment.

The user interface may incorporate a display that can show a screen of trend information having a system view, a trend pane listing one or more trends, or a library. The system view may show some components of the system. The trend pane has one or more items selected from a group comprising trend names, trend descriptions, point types, point names, plant names, buffer sizes, controller names of the trends, and controller names of points. The screen of trend information may further have a middle row that shows one or more items from a group comprising an indicator of a number of trend points, an indicator of available records, a button for data retention time, and a button for creating trends.

The screen of trend information may further have a pane that shows an indicator of buffer size that indicates an individual memory size that can be calculated for a point and in turn for equipment or a plant unit.

The screen of trend information may further have a row that shows a button for retention time for a controller that indicates a period of time available to configure a memory for a trend.

The indicator of available records may show a memory amount that may be available in a trend after a creating trending for a piece of equipment of an HVAC system;

An approach for trending with information about available memory, may incorporate exposing raw memory of a controller for a configuration of a trend by calculating available records in view of total available memory of the controller, and one more items of a group comprising buffer size, log interval and retention time, when a trend object is created, and automatically recalculating available records when one or more items of the group having buffer size, log interval and retention time, are affected or changed. One may allocate memory to trend configurations.

A predetermined amount of memory may be translated into available records in a user-understandable format.

A total memory of a controller may be translated into available records per controller.

A creating one trend with a default buffer size, log interval and retention time, a tool with the information of default buffer size, log interval and retention time, may automatically calculate how many records can be created.

The controller may be connected to a cloud, for remote accessibility by a user.

The controller may be a part of an HVAC system. An available record indication may show memory available in a trend after creating trending for a component of a selected unit or component of the HVAC system.

A mechanism for determining memory for trending, may incorporate a controller having a processor and a memory. The processor may calculate available records in view of a total amount of the memory of the controller. A calculation of the available records may consider impacting parameters of buffer size, log interval and retention time, when a trend object is created. A recalculation of available records may occur when one or more of the impacting parameters are changed or affected.

The available records may be in a user-understandable format of memory.

A trend may be created with a default buffer size, a log interval and a retention time. From a trend creation, based on default buffer size, a log interval and a retention time, an automatic calculation may determine how many more or less available records are needed.

Any publication or patent document noted herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A system for determining memory for trend configuring, comprising:
a user interface;
a controller connected to the user interface;
a parameters module connected to the user interface; and
a records module connected to the user interface; and
wherein:
the parameters module comprises trend parameters;
the records module comprises available records;
one or more trend parameters are selected from a group comprising buffer size, retention time and log interval; and
a raw memory of the controller needed for a trend configuration is exposed, leading to a calculation of available records based on the one or more trend parameters selected from the group comprising buffer size, retention time and log interval.

2. The system of claim 1, wherein the calculation of available records is automatically redone when the one or more trend parameters are changed.

3. The system of claim 1, wherein a total memory of the controller can be translated into available records for a trend considering X seconds for a log interval and Y days for retention time.

4. The system of claim 1, wherein after a trend is created with a default buffer size, log interval and retention time, a tool calculates a number of additional available records that can be created.

5. The system of claim 4, wherein a calculation is based on equations comprising:

$$A = M - N \times B; \text{ and}$$

$$D = B \times L; \text{ and}$$

wherein:
A is a number of available records;
M is a number of maximum records that can be created;
N is number of trends already created;
B is buffer size which is a number of records per trend;
D is data retention in time units; and
L is a log interval in time units.

6. The system of claim 5, wherein the calculation reoccurs when one or more of variables of a group comprising A, M, N, B, D and L, change.

7. The system of claim 5, wherein a result of the calculation indicates how many trend records can be created for an intuitive purpose of planning trends for equipment.

8. The system of claim 7, wherein the equipment is heating, ventilation, and air-conditioning (HVAC) equipment.

9. The system of claim 1, wherein:
the user interface comprises a display that can show a screen of trend information having a system view, a trend pane listing one or more trends, or a library;
the system view shows some components of the system;

the trend pane has one or more items selected from a group comprising trend names, trend descriptions, point types, point names, plant names, buffer sizes, controller names of the trends, and controller names of points; and the screen of trend information further has a middle row that shows one or more items from a group comprising an indicator of a number of trend points, an indicator of available records, a button for data retention time, and a button for creating trends.

10. The system of claim 9, wherein the screen of trend information further has a pane that shows an indicator of buffer size that indicates an individual memory size that can be calculated for a point and in turn for equipment or a plant unit.

11. The system of claim 9, wherein
the screen of trend information further has a row that shows a button for retention time for a controller that indicates a period of time available to configure a memory for a trend; or the indicator of available records shows a memory amount that may be available in a trend after a creating trending for a piece of equipment of a heating, ventilation, and air-conditioning (HVAC) system.

12. A method for trending with information about available memory, comprising:
exposing, via a controller, raw memory of the controller for a configuration of a trend by calculating available records in view of total available memory of the controller, and one or more items of a group incorporating buffer size, log interval and retention time, when a trend object is created; and automatically recalculating, via the controller, available records when one or more items of the group comprising buffer size, log interval and retention time, are affected or changed; and wherein one can allocate memory to trend configurations.

13. The method of claim 12, wherein a predetermined amount of memory is translated into available records in a user-understandable format.

14. The method of claim 12, wherein a total memory of a controller is translated into available records per controller.

15. The method of claim 12, wherein a creating one trend with a default buffer size, log interval and retention time, a tool with the information of default buffer size, log interval and retention time, automatically calculates how many records can be created.

16. The method of claim 12 the controller is connected to a cloud, for remote accessibility by a user.

17. The method of claim 12, wherein:
the controller is a part of a heating, ventilation, and air-conditioning (HVAC) system; and
an available record indication shows memory available in a trend after creating trending for a component of a selected unit or component of the HVAC system.

18. A mechanism for determining memory for trending, comprising:
a controller having a processor and a memory; and
wherein:
the processor calculates available records in view of a total amount of the memory of the controller;
a calculation of the available records considers impacting parameters of buffer size, log interval and retention time, when a trend object is created; and
a recalculation of available records occurs when one or more of the impacting parameters are changed.

19. The mechanism of claim 18, wherein the available records are in a user-understandable format of memory.

20. The mechanism of claim 18, wherein:
a trend can be created with a default buffer size, a log interval and a retention time; and
from a trend creation, based on default buffer size, a log interval and a retention time, an automatic calculation determines how many more or less available records are needed.

* * * * *